United States Patent [19]

Imai et al.

[11] Patent Number: 4,906,086
[45] Date of Patent: Mar. 6, 1990

[54] REARVIEW MIRROR DEVICE FOR MOTORCYCLES

[75] Inventors: Akira Imai, Tokyo; Takahisa Suzuki, Saitama; Kenichi Nishimoto, Saitama; Ken Yamaguchi, Saitama, all of Japan

[73] Assignee: Honda Giken Kogyo Kabushiki Kaisha, Tokyo, Japan

[21] Appl. No.: 208,139

[22] Filed: Jun. 16, 1988

[30] Foreign Application Priority Data

Jun. 19, 1987 [JP] Japan ................. 62-152896
Jun. 19, 1987 [JP] Japan ............. 62-94078[U]

[51] Int. Cl.$^4$ .......................... B60R 1/02; B62J 29/00
[52] U.S. Cl. ................................ 350/606; 350/582; 350/612; 296/78.1; 180/219
[58] Field of Search ............... 350/600, 606, 612, 631, 350/582; 296/78.1; 280/289 S; 180/219

[56] References Cited

U.S. PATENT DOCUMENTS 3,915,563 10/1975 Zimmer ............................ 350/631
4,441,574 4/1984 Kohyama et al. .................. 180/219
4,696,509 9/1987 Yagasaki et al. .................. 296/78.1
4,759,620 7/1988 Sakuma et al. ..................... 350/632

FOREIGN PATENT DOCUMENTS 627998 3/1936 Fed. Rep. of Germany ...... 350/606
58-116491 9/1983 Japan .
60-92686 6/1985 Japan .

Primary Examiner—Bruce Y. Arnold
Assistant Examiner—R. D. Shafer

[57] ABSTRACT

A rearview mirror device for a motorcycle is designed to reduce the area of forward projection of the motorcycle and increase the rigidity of the support member for a rearview mirror. The rearview mirror device includes a motorcycle frame, a steering handlebar projecting laterally from the motorcycle frame, a pair of handgrips mounted on opposite outer ends, respectively, of the handlebar, and a pair of rearview mirrors disposed forwardly and downwardly of the handgrips, respectively, when the handlebar is in a neutral steering position.

6 Claims, 3 Drawing Sheets

REARVIEW MIRROR DEVICE FOR MOTORCYCLES

BACKGROUND OF THE INVENTION

1. Field of the Invention:

The present invention relates to a rearview mirror device for use on a motorcycle.

2. Description of the Relevant Art:

As shown in FIG. 7 of the accompanying drawings, many conventional motorcycles generally have rearview mirrors 103 disposed considerably upwardly of a handlebar 109. The motorcycle illustrated in FIG. 7 includes a cowling 102 which covers a front portion of the frame of the motorcycle. The rearview mirrors 103 are supported on respective stays 104 which project upwardly from opposite sides of the cowling 102.

With the rearview mirrors 103 positioned above the handlebar 109, since the rearview mirrors 103 give the rider a view of the area behind the motorcycle over the upper arms of the rider, it is necessary that the rearview mirrors 103 project laterally of the motorcycle beyond a certain distance. It is therefore difficult to increase the mechanical strength and rigidity of the stays 104 for the prevention of vibration of the rearview mirrors 103. If the diameter of the stays 104 were increased for greater rigidity, the weight of the upper portion of the motorcycle would be increased, and so would the area of forward projection of the motorcycle, resulting in increased air resistance or aerodynamic drag. Moreover, inasmuch as the stays 104 project laterally from the opposite sides of the cowling 102, the rigidity of an upper portion of the cowling 102 including a windshield 105 has to be increased.

Japanese Laid-Open Utility Model Publication No. 60-92686 discloses a rearview mirror device in which rearview mirrors are mounted on opposite sides of a cowling rearwardly of a handlebar. The disclosed rearview mirror device is however disadvantageous in that the angle of view when the rider gets a front view and the angle of view when the rider gets a rear view through the rearview mirrors are widely different from each other, i.e., the rider has to move his eyes through a large angle for a shift from a front view to a rear view or vice versa.

Another problem with the conventional rearview mirror device is that rain water deposited on an upper surface of the cowling while the motorcycle is running in rain tends to be attached to the reflecting surfaces of the rearview mirrors due to air turbulences developed at the upper ends of the rearview mirrors.

SUMMARY OF THE INVENTION

It is an object of the present invention to provide a rearview mirror device for a motorcycle, which reduces the area of forward projection of a motorcycle, increases the rigidity of support members for rearview mirrors to increase the mechanical strength of the support members for preventing the rearview mirrors from vibration, and prevents rain water from being attached to reflecting surfaces of the rearview mirrors while the motorcycle is running in rain.

A rearview mirror device for a motorcycle according to the present invention includes a motorcycle frame, a steering handlebar projecting laterally from the motorcycle frame, a pair of handgrips mounted on opposite outer ends, respectively, of the handlebar, and a pair of rearview mirrors disposed forwardly and downwardly of the handgrips, respectively, when the handlebar is in a neutral steering position.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
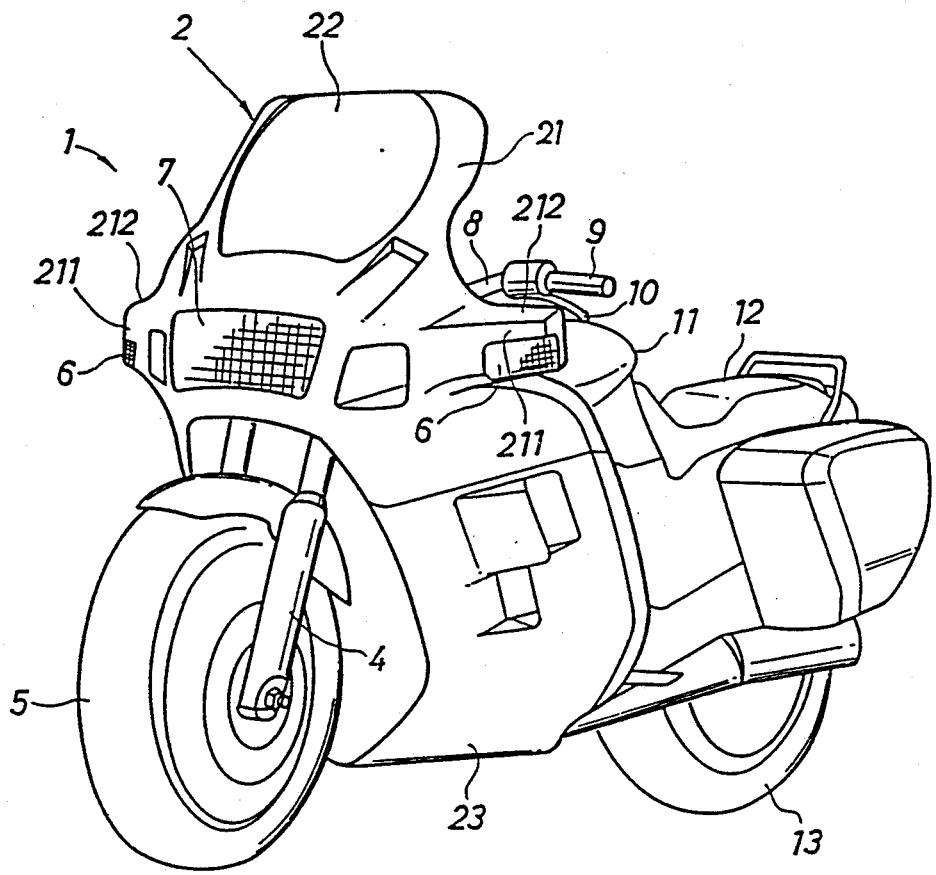
FIG. 1 is a perspective view of a motorcycle having a rearview mirror device according to an embodiment of the present invention.

As shown in FIG. 1, a motorcycle 1 has a front steerable wheel 5 rotatably mounted on a front portion thereof and a rear drive wheel 13 rotatably mounted on a rear portion thereof. A fuel tank 11 is supported on a frame (not shown) substantially centrally of the motorcycle and a rider's seat 12 is supported on the frame behind the fuel tank 11. The front wheel 5 is rotatably supported on a front fork 4 angularly movably supported on a front end of the frame at a certain caster angle. The front wheel 5 can be steered by turning a handlebar 8 coupled to the upper end of the front fork 4. Handgrips 9 (only the lefthand handgrip is shown in FIG. 1) are attached respectively to the opposite ends of the handlebar 8. A clutch lever 10 is mounted on the handlebar 8 near the lefthand handgrip 9. Although not shown, a brake lever is also mounted on the handlebar 8 near the righthand handgrip.

A cowling 2 is mounted on a front portion of the frame of the motorcycle 1. The cowling 2 comprises an upper cowl 21 and a lower cowl 23. The upper cowl 21 covers an upper portion of the front fork 4 and a central portion of the handlebar 8, and has a transparent or semitransparent windshield 22 in its upper portion. A headlight 7 is mounted in the front end of the upper cowl 21. Indicator lights 6 are mounted in front surfaces of a pair of side ends 211, respectively, of the upper cowl 21. The side ends 211 have respective upper surfaces 212.

The side ends 211 of the upper cowl 21 serve as respective housings of rearview mirrors 3 (FIG. 2), which are angularly adjustably mounted on the rear ends of the housings by means of attachment members (not shown).

Figure 2:
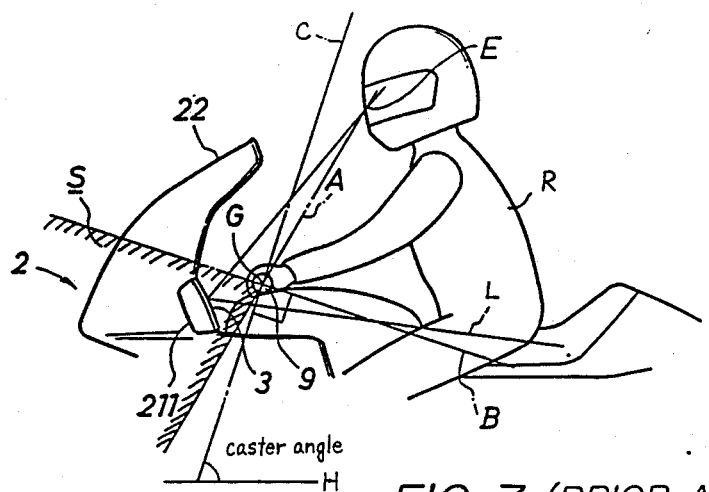
FIG. 2 is a fragmentary side elevational view showing a position where a rearview mirror is disposed.
Figure 3:
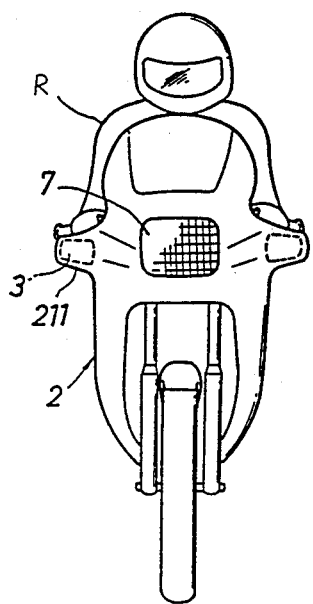
FIG. 3 is front elevational view of the motorcycle shown in FIG. 1, with a rider sitting on the motorcycle.

As illustrated in FIG. 2, each of the rearview mirrors 3 is disposed forwardly and rearwardly of the handgrip 9 while the handlebar 8 is in a neutral steering position when the motorcycle 1 is viewed in side elevation. Preferably, the center of the rearview mirror 3 should be positioned in a hatched range S in FIG. 2. The range S is surrounded by a straight line A connecting the center G of the handgrip 9 and the eyes E of the rider R and a straight line B passing through the center G of the handgrip 9 perpendicularly to a straight line C which forms the caster angle of the front wheel 5 with the horizon H, the range S being positioned forwardly of the handgrip 9.

Figure 7:
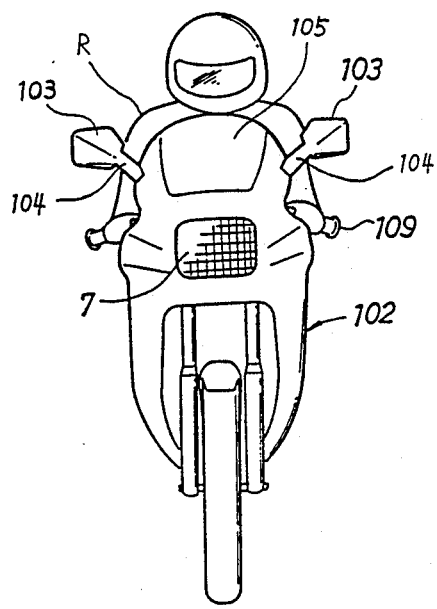
FIG. 7 is a front elevational view of a motorcycle having a conventional rearview mirror device.

Light L from an area behind the motorcycle 1 passes alongside of the waist of the rider R, is then reflected by the rearview mirror 3, and reaches the eyes E of the rider R. Therefore, the rearview mirror 3 gives the rider a rear view of the area behind one side of the waist of the rider R. The rider R can therefore view the rear area by seeing the rearview mirror 3 along a line slightly above the handgrip 9. In the conventional rearview mirror device shown in FIG. 7, each of the rearview mirrors 103 is positioned considerably upwardly of one of the handgrips 109 to give the rider R a rear view alongside of the corresponding shoulder of the rider R. Since the width of a human body at the waist is smaller than the width of the human body at the shoulders, the rearview mirrors 3 of the rearview mirror device according to the present invention are closer to the transverse center of the motorcycle 1 than the rearview mirrors 103 of the conventional rearview mirror device. Therefore, support members such as housings or stays of the rearview mirrors 3 may be of a shorter length. Accordingly, the area of forward projection of the motorcycle 1 is reduced, and the support members of the rearview mirrors 3 are increased. Inasmuch as the rearview mirrors 3 are positioned in front of the handgrips 9, the difference between the angle of view when the rider R gets a front view and the angle of view when the rider R gets a rear view is smaller than that in the rearview mirror device disclosed in Japanese Utility Model Publication No. 60-92686.

The housings of the rearview mirrors may be constructed as described below for preventing rainwater from being attached to the mirror surfaces of the rearview mirrors while the motorcycle is running in rain.

Figure 4:
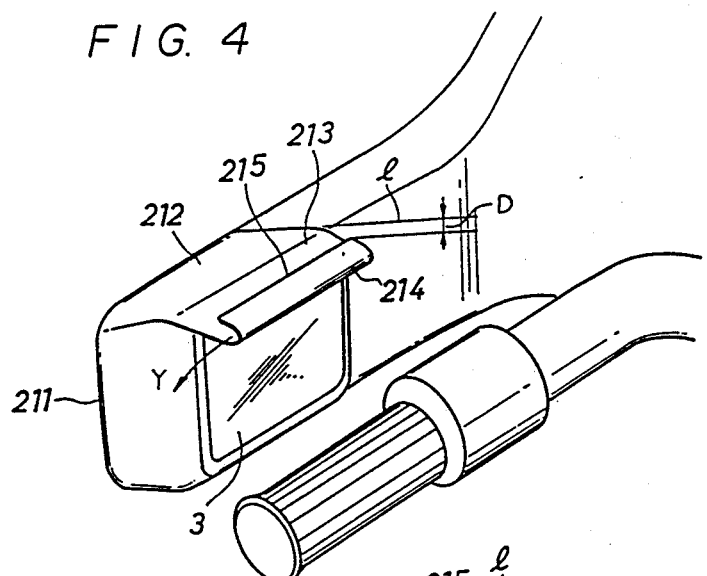
FIG. 4 is a perspective view of a rearview mirror with a housing thereof having a groove.
Figure 5:
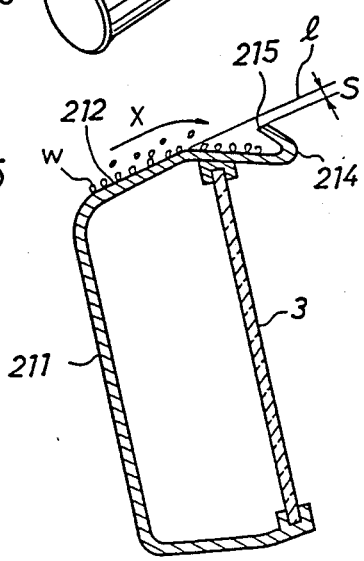
FIG. 5 is a vertical cross-sectional view of the rearview mirror and its housing shown in FIG. 4.

As illustrated in FIG. 4, each of the side ends 211 serves as a housing of one of the rearview mirrors 3, which is mounted on the rear end of the housing by means of an attachment member (not shown). As shown in FIG. 5, the rearview mirror housing has an upper panel 212 including a rear portion bent rearwardly and downwardly from a position near the upper edge of the rearview mirror 3 in overhanging relation to the reflecting mirror surface of the rearview mirror 3. The rear end of the bent rear portion 213 of the upper panel 212 is folded back on itself substantially into a U shape, thus defining a groove 214 opening substantially forwardly and extending transversely of the motorcycle.

In this embodiment, the upper panel 212 has a distal edge 215 of the folded end which is positioned downwardly of an extension 1 of the upper surface of the upper panel 212 of the housing 211, with a gap D being defined therebetween.

While the motorcycle is running in rain, water droplets W are deposited on the upper surface 212 of the side end 211, and some of these water droplets W are forced to move in the direction of the arrow X toward the reflecting mirror surface of the rearview mirror 3 due to air turbulences developed near the upper end of the rearview mirror 3, and are received by the groove 214. Therefore, these water droplets are prevented from being attached to the reflecting surface of the rearview mirror 3.

Figure 6:
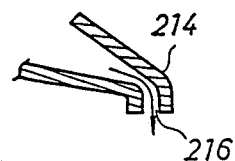
FIG. 6 is an enlarged fragmentary cross-sectional view of a water drain hole.

The water droplets received by the groove 214 may be drained in such a direction as not to affect the rearview mirror 3 or the driver, e.g., laterally in the direction of the arrow Y (FIG. 4). Alternatively, as shown in FIG. 6, the rainwater collected on the bottom of the groove 214 may be drained through a drain hole 216 defined in the bottom of the groove 214.

With the present invention, as described above, the rearview mirrors may be positioned closely to the transverse center of the motorcycle thereby to reduce the area of forward projection of the motorcycle and also to increase the rigidity and hence the mechanical strength of the support members for the rearview mirrors. Therefore, the rearview mirrors are prevented from vibration.

Rainwater droplets attached to the upper surface of the housing of each rearview mirror and forced toward the reflecting surface of the rearview mirror due to air turbulences developed near the upper end of the rearview mirror housing, are received in the groove, and hence prevented from being deposited on the reflecting surface of the rearview mirror.

Although there have been described what are at present considered to be the preferred embodimens of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A rearview mirror device for a motorcycle having a frame, comprising:
   a cowling covering a front portion of said motorcycle frame;
   a steering handlebar projecting laterally from said motorcycle frame;
   a pair of handgrips mounted on opposite outer ends of said handlebar; and
   a pair of rearview mirrors each disposed forwardly and downwardly of a respective one of said handgrips with respect to said motorcycle frame when viewed from a side elevation of said motorcycle, when said handlebar is in a neutral steering position;
   said cowling including integral rearview mirror housings which each accommodate a said rearview mirror therein; and
   said rearview mirror housings positioned forwardly of said handgrips in the direction of motorcycle forward movement, and inherently operable to provide wind deflector means forwardly of said handgrips 2. A rearview mirror device according to claim 1, wherein said cowling has indicator lamps each mounted on a front surface of a said rearview mirror housing.

3. A rearview mirror device according to claim 1, wherein each said housing includes an upper panel having a rear portion bent rearwardly and downwardly beyond the reflecting surface of said rearview mirror and including an end portion folded back upwardly substantially into a U shape, defining a groove extending substantially transversely of said motorcycle frame.

4. A rearview mirror device according to claim 1, wherein each of said rearview mirrors has a center disposed in a range defined between a straight line connecting the center of one of said handgrips and the eyes of a rider sitting on the motorcycle and another straight line passing through the center of said one handgrip perpendicularly to a straight line which forms a caster angle with a front wheel of said motorcycle and the horizon.

5. A rearview mirror device for a motorcycle having a frame, comprising:
   a cowling covering a front portion of said motorcycle frame;
   a steering handlebar projecting laterally from said motorcycle frame;
   a pair of handgrips mounted on opposite outer ends of said handlebar; and
   a pair of rearview mirrors each disposed forwardly and downwardly of a respective one of said handgrips with respect to said motorcycle frame when viewed from a side elevation of said motorcycle when said handlebar is in a neutral steering position;
   said cowling including integral rearview mirror housings which each accommodate a said rearview mirror therein;
   each said housing including
   an upper panel having a rear portion bent rearwardly and downwardly beyond the reflecting surface of said rearview mirror, and
   an end portion folded back upwardly substantially into a U shape, defining a groove extending substantially transversely of said motorcycle frame.

6. A rearview mirror device for a motorcycle having a frame, comprising:
   a cowling covering a front portion of said motorcycle frame;
   a steering handlebar projecting laterally from said motorcycle frame;
   a pair of handgrips mounted on opposite outer ends of said handlebar; and
   a pair of rearview mirrors each disposed forwardly and downwardly of a respective one of said handgrips with respect to said motorcycle frame when viewed from a side elevation of said motorcycle, when said handlebar is in a neutral steering position;
   said cowling including integral rearview mirror housings which each accommodate a said rearview mirror therein;
   said cowling having indicator lamps, each mounted on a front surface of a said rearview mirror housing; and
   each of said rearview mirrors having a center disposed in a range defined between a straight line connecting the center of one of said handgrips and the eyes of a rider sitting on the motorcycle and another straight line passing through the center of said one handgrip perpendicularly to a straight line which forms a caster angle with a front wheel of said motorcycle and the horizon.

\* \* \* \* \*